Feb. 18, 1969    M. F. WALKER    3,427,900
MINIATURE DIFFERENTIAL
Filed Oct. 25, 1966

INVENTOR.
MELVIN F. WALKER
BY
Leonard H. King
ATTORNEY

United States Patent Office 3,427,900
Patented Feb. 18, 1969

3,427,900
MINIATURE DIFFERENTIAL
Melvin F. Walker, Deer Park, N.Y., assignor to
Designatronics, Inc., Mineola, N.Y.
Filed Oct. 25, 1966, Ser. No. 589,265
U.S. Cl. 74—710    4 Claims
Int. Cl. F16h 1/38; F16c 17/02

This invention relates generally to differentials and more particularly to an improved differential in the miniature class and having an improved bearing arrangement.

It should be clearly understood at the outset that the present invention is in a different category than the type of differential used in an automotive drive system and cannot structurally be compared thereto. By way of example, the input shaft of the present invention is in the order of ¼ inch and may be as small as 5⁄64 inch. The output torque is in the order of 20 oz. in., so that the instant invention cannot be equated, except perhaps functionally to the larger differentials. As will be fully appreciated from the discussion that follows, the structure of this invention overcomes shortcomings that are of minimal importance in automotive differentials.

As is well known, a bevel gear differential is in effect an epicyclic gear train, wherein the motion of the carrier is directly proportional to the sum of the motions of the two bevel gear shafts. The differential motion may be considered the resultant or difference between the original motions. One important area of use for the miniature type of differential is in computing devices where it is necessary to add the effects of several independent variables. The high degree of accuracy required in present day computers, particularly when used in conjunction with missiles or rockets, is well known but difficult to obtain with any consistency. One source of inaccuracy is in the extremely small, compact differential systems generally employed.

At a substantially higher cost, the accuracy of small differentials has been improved by the use of ball bearings. However, there is presently a great need for a lower cost differential that has a high degree of precision. To reduce costs, the ball bearings are replaced by sleeve bearings but this results in poor concentricity and lubrication. Both of these shortcomings materially reduce the life of the unit. Therefore, the demand for a differential having the combined desirable characteristics of the more precise ball bearing unit and the lower cost sleeve bearing unit has not been met by the devices now on the market. Stated another way, the lower cost prior art devices employing sleeve bearings have not been made with the concentricities and more effective lubrication of the precision differentials utilizing ball bearings.

The prior art differentials employing sleeve bearings were usually constructed with the bearings press fit into the bevel gears which were in turn mounted on journals. By using this type of construction there were several factors that determined the precision of the device. The accuracy of the gear to its bore and the outside to inside diameter concentricity of the bearing were the primary considerations.

The precision of the differential was also determined by the effectiveness of the bearing lubrication. Insufficient lubrication drastically reduces the life expectancy of the device. In the prior art of miniature differentials, the sleeve bearing was very small and therefore had a very limited oil capacity. Additionally, the centrifugal forces encountered at high operating speeds would tend to force the oil outwardly and away from the journal. Prolonged rotation at even moderate speeds, say 500 r.p.m., can lead to complete lubrication and bearing failure due to the centrifugal throw of the oil.

By way of contrast, in the present invention an enlarged bearing is utilized and the journal is eliminated. The bearing is made part of the spider structural assembly and the bores of the gears ride directly on the bearing. The centrifugal forces resulting from the rotation of the spider will cause the oil to flow in the direction of the gear bores. It is an important advantage of this invention that the available bearing surface has been increased by more than 150%.

The increase in bearing size is directly responsible for a substantial increase in oil capacity. With the construction to be described in detail hereinafter, the lubrication capacity has been increased approximately 200%. It is readily apparent that such a substantial lubricant increase in a unit so very small and which is subject to extremely high rotational velocities over extended periods of time will dramatically lengthen the useful life of the device.

Another feature of the instant construction is the improved concentricity that is now available. Because one part, the journal, has been eliminated, there is one less possible source of error. Therefore, greater precision is achieved without additional machining costs. In the new construction shown in the drawing, only the concentricity of the outside to inside diameters of the gears is a factor in determining the overall concentricity of the differential. An auxiliary advantage gained by the improved construction is that there is one less part to manufacture and stock. Also assembly time is correspondingly reduced.

Accordingly, it is an object of this invention to provide an improved miniature precision differential assembly.

Another object is to provide an improved sleeve bearing differential having greater concentricity than similar units in the prior art.

An additional object is to provide an enlarged sleeve bearing in a miniature differential whereby a greater lubricant supply is available.

A particular feature of this invention is that one of the prior art components is eliminated thus permitting higher overall concentricities in the unit.

Still another object of this invention is to provide a hollow, elongated bearing that is a structural part of the spider assembly and which directly supports the bevel or miter gears of the differential.

Yet another object is to provide a sleeve bearing differential having concentricity characteristics approaching that of a ball bearing differential but at a lower cost.

A further object is to provide an improved differential requiring less assembly steps than a comparable prior art device.

These and other features, objects and advantages of the invention will, in part, be pointed out with particularity and will, in part, become obvious from the following more detailed description of the invention taken in conjunction with the accompanying drawing which forms an integral part thereof.

In the various figures of the drawing like reference characters designate like parts.

Figure 1:
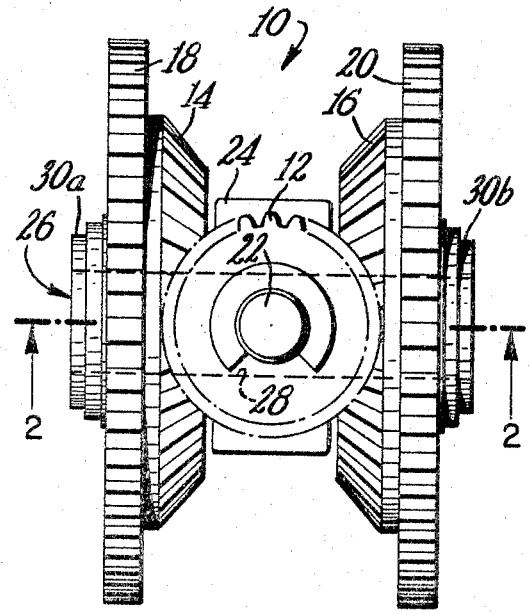
FIG. 1 is a plan view of a miniature, precision bevel gear differential embodying the concepts of this invention.
Figure 2:
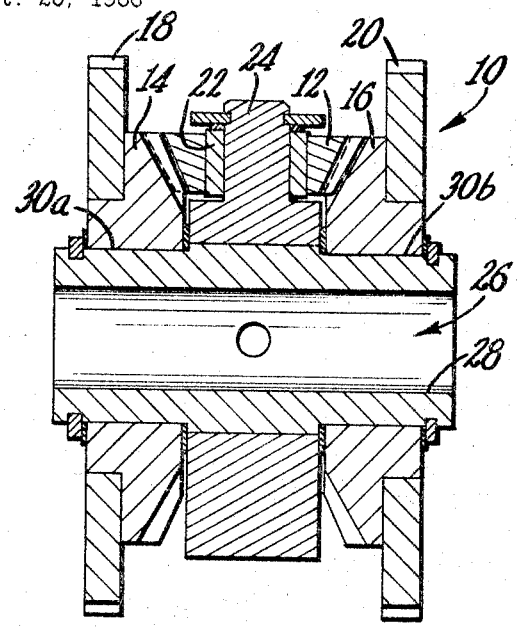
FIG. 2 is a sectional elevational view taken along line 2—2 of FIG. 1.

Referring now to FIG. 1 and FIG. 2, the improved differential 10 is comprised of a pinion 12 in meshing engagement with opposed bevel gears 14 and 16. Spur gears 18 and 20 are staked or otherwise integrally secured to bevel gears 14 and 16, respectively. Pinion 12 is rotatably mounted on a bushing member 22 located at one end of spider 24. Without going into great detail, it is to be noted that the components of the differential are, where appropriate, provided with suitable shims and retaining rings in order to accurately determine the axial placement of the gears and to prevent axial movement thereof.

In FIG. 2, it will be seen that spider 24 is press fit on the central portion of an elongated bearing member 26 having an axial bore 28 arranged to receive a power input shaft (not shown). It is preferred that the bearing be of the permanently lubricated type having oil impregnated therein. The outside end surfaces 30a and 30b of the central bearing rotatably support gear sets 14/18 and 16/20, respectively. Thus it will be seen that member 26 combines the function of a journal and a bearing.

Figure 3:
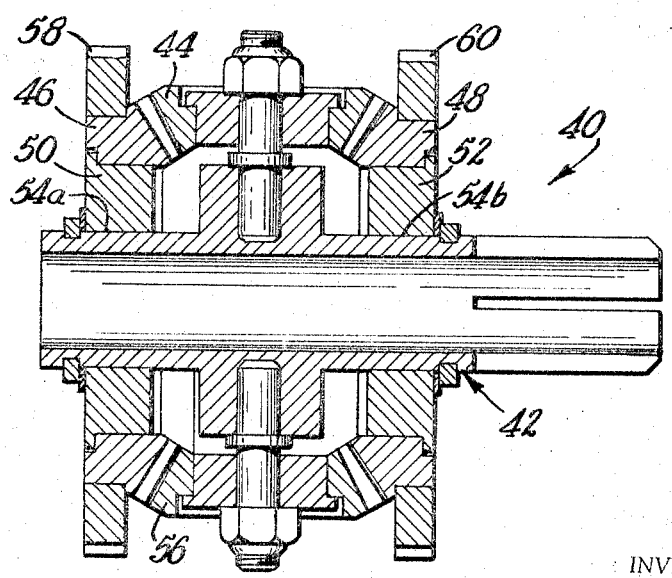
FIG. 3 is a sectional elevational view similar to FIG. 2 but showing the construction of a prior art device.

The device shown in FIG. 3 is a typical example of prior art construction. Differential 40 is comprised of a hollow, elongated spider 42 on which a first pinion 44 is rotatably mounted. Bevel gears 46 and 48 are in meshing engagement with pinion 44 and are supported on bearings 50 and 52, respectively. Outer ends 54a and 54b of the spider support bearings 50 and 52, respectively. A second pinion 56 is also mounted on the spider, the function of the second pinion being to balance the first pinion 44. The counterpart of the second pinion in the present invention is the mass at the lower end of spider 22, as seen in FIG. 2. End gears 58 and 60 are rigidly secured to bevel gears 46 and 58, respectively.

From the drawing, it will be seen that the total concentricity of the prior art device is the sum of several independent variables, as follows:

(1) The concentricity of the diameter of the bearings with respect to the inside diameter of the bearings;

(2) The concentricity of the outside diameter of the bevel gears with respect to the inside diameter of the bevel gears; and (3) The concentricity accuracy of the assembly of the bearings to the gears.

By way of contrast, the only comparable factor involved in the present invention is the concentricity of the outside diameter of the bevel gears with respect to the inside diameter thereof. Because less components are concerned there is less likelihood for concentricity errors. In addition, since precision machining and assembling are reduced, the total cost of the unit is less. Alternatively, at a given cost, a more accurate and durable differential may be produced.

A second important feature of the present invention is the increased lubricant supply that is now available. A full appreciation of the improved construction may be had by a comparison of FIG. 2 and FIG. 3 which are four times actual size and drawn to substantially the same scale. The bearings, either 50 or 52 in the old design, each have a volume of approximately 0.015 cubic inch whereas one-half of bearing 26 in the new design has a volume of approximately 0.029 cubic inch. The volume gain of the new design over the old is therefore 193%.

The present construction also provides an enlarged interface area between the outside diameter of the bearing and the inside diameter of the bevel gear. In FIG. 2, the interfaces are labeled 30a and 30b while in FIG. 3, the interfaces are labeled 54a and 54b. Considering the old design first, the interface area is approximately 0.098 square inch and in the new design, the comparable area is approximately 0.164 square inch. The increase in the bearing area is therefore 167%.

It should be realized that the above mentioned percentage increases have been obtained in a miniature device without any loss of precision. Quite the contrary, the precision of the differential has been increased without an attendant increase in size because variables that tend to cause concentricity errors have been eliminated. Moreover, the centrifugal forces developed by the rotating member tends to throw the lubricant toward the bearing interface (FIG. 2). The prior art device as illustrated in FIG. 3 produces centrifugal forces that tend to throw the lubricant away from the bearing interface.

There has been disclosed heretofore the best embodiment of the invention presently contemplated and it is to be understood that various changes and modifications may be made by those skilled in the art without departing from the spirit of the invention.

What is claimed is:

1. A differential gearing assembly comprising:
    (a) a single elongated, tubular bearing member having means for securing a shaft thereto;
    (b) first and second gears mounted directly on said bearing proximate the ends thereof; and
    (c) a rotatable pinion gear secured to said bearing member at the central portion thereof and in meshing engagement with said first and second gears.

2. The assembly in accordance with claim 1 including third and fourth gears rigidly secured to said first and second gears respectively for rotation therewith.

3. The assembly in accordance with claim 1 wherein said bearing member is of the permanently lubricated type.

4. The assembly in accordance with claim 1 including a spider radially secured to the central portion of said bearing member intermediate said first and second gears, said pinion gear being mounted on one end of said spider for rotation therewith about the longitudinal axis of said bearing member and the radial axis of said spider.

References Cited
UNITED STATES PATENTS

| | | | |
|---|---|---|---|
| 475,929 | 5/1892 | Carroll. | |
| 1,078,837 | 11/1913 | Curtis | 74—710 XR |
| 1,686,431 | 10/1928 | Wyman | 74—710 |
| 1,892,573 | 12/1932 | Harvey | 74—713 XR |
| 2,309,441 | 1/1943 | Cook | 74—710 |
| 2,393,203 | 1/1946 | Tarbell et al. | |
| 2,774,253 | 12/1956 | Minard et al. | 74—713 XR |
| 3,050,301 | 9/1962 | Palazzolo | 74—713 XR |

ARTHUR T. McKEON, *Primary Examiner.*

U.S. Cl. X.R.

308—237